United States Patent
Li et al.

(10) Patent No.: US 10,439,809 B2
(45) Date of Patent: Oct. 8, 2019

(54) METHOD AND APPARATUS FOR MANAGING APPLICATION IDENTIFIER

(71) Applicant: Huawei Technologies Co., Ltd., Shenzhen (CN)

(72) Inventors: Yingtao Li, Shenzhen (CN); He Wei, Shenzhen (CN); Jinbo Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 15/599,027

(22) Filed: May 18, 2017

(65) Prior Publication Data

US 2017/0257213 A1    Sep. 7, 2017

Related U.S. Application Data

(63) Continuation of application No. PCT/CN2015/091764, filed on Oct. 12, 2015.

(30) Foreign Application Priority Data

Apr. 30, 2015   (CN) .......................... 2015 1 0217519

(51) Int. Cl.
*H04L 29/00*   (2006.01)
*H04L 9/08*   (2006.01)
(Continued)

(52) U.S. Cl.
CPC .......... *H04L 9/0866* (2013.01); *H04L 9/0822* (2013.01); *H04L 9/3073* (2013.01);
(Continued)

(58) Field of Classification Search
CPC ... H04L 9/0866; H04L 9/3247; H04L 9/0822; H04L 9/3297; H04L 9/3236; H04L 9/32; H04L 9/3231; H04L 9/3073
See application file for complete search history.

(56) References Cited

U.S. PATENT DOCUMENTS 9,333,426 B1 *  5/2016  Bachman ................ A63F 13/12
2002/0099767 A1 *  7/2002  Cohen .................... H04L 29/06
                                                              709/203
(Continued)

FOREIGN PATENT DOCUMENTS

CN        101359991 A       2/2009
CN        102769606 A       11/2012
(Continued)

OTHER PUBLICATIONS

Machine Translation and Abstract of Chinese Publication No. CN103607282, Feb. 26, 2014, 6 pages.
(Continued)

*Primary Examiner* — Don G Zhao
(74) *Attorney, Agent, or Firm* — Conley Rose, P.C.

(57) ABSTRACT

A method and an apparatus for managing an application identifier, where the application identifier management apparatus receives a request sent by a terminal to apply for a private key of an application identifier. The identifier management apparatus acquires a user identifier and an application identifier according to the request. The identifier management apparatus acquires a feature identifier of the user according to the user identifier, generates a private key of the application identifier according to the application identifier and the feature identifier of the user, and sends the private key of the application identifier to the terminal.

14 Claims, 7 Drawing Sheets

(51) Int. Cl.
*H04L 9/32* (2006.01)
*H04L 9/30* (2006.01)

(52) U.S. Cl.
CPC .............. *H04L 9/32* (2013.01); *H04L 9/3231* (2013.01); *H04L 9/3236* (2013.01); *H04L 9/3247* (2013.01); *H04L 9/3297* (2013.01)

(56) References Cited

U.S. PATENT DOCUMENTS

| | | | | |
|---|---|---|---|---|
| 2012/0331298 | A1* | 12/2012 | Xu | H04L 63/08 713/171 |
| 2013/0132717 | A1* | 5/2013 | Brand | H04L 9/0825 713/156 |
| 2014/0003675 | A1* | 1/2014 | Li | G06F 21/32 382/123 |
| 2014/0059162 | A1* | 2/2014 | Herbrich | G06F 16/273 709/217 |
| 2014/0059163 | A1* | 2/2014 | Herbrich | G06F 9/5055 709/217 |
| 2014/0214670 | A1* | 7/2014 | McKenna | G06Q 20/40145 705/44 |
| 2014/0259148 | A1* | 9/2014 | Xie | G06F 21/60 726/16 |
| 2015/0023498 | A1* | 1/2015 | Asim | H04L 9/085 380/44 |
| 2015/0066766 | A1* | 3/2015 | Wittenburg | G06F 21/41 705/44 |
| 2015/0312256 | A1* | 10/2015 | Seibert, Jr. | H04L 63/0807 726/8 |
| 2016/0241399 | A1* | 8/2016 | Huang | H04L 9/30 |
| 2016/0380997 | A1* | 12/2016 | Blasi | G06F 21/43 726/9 |
| 2018/0234255 | A1* | 8/2018 | Fu | H04L 9/0822 |

FOREIGN PATENT DOCUMENTS

| | | |
|---|---|---|
| CN | 103607282 A | 2/2014 |
| CN | 104283686 A | 1/2015 |
| EP | 2320600 A1 | 5/2011 |
| KR | 20030045419 A | 6/2003 |

OTHER PUBLICATIONS

Foreign Communication From a Counterpart Application, PCT Application No. PCT/CN2015/091764, English Translation of International Search Report dated Feb. 5, 2016, 2 pages.
Machine Translation and Abstract of Chinese Publication No. CN101359991, Feb. 4, 2009, 14 pages.
Machine Translation and Abstract of Chinese Publication No. CN102769606, Nov. 7, 2012, 14 pages.
Machine Translation and Abstract of Chinese Publication No. CN104283686, Jan. 14, 2015, 17 pages.
Foreign Communication From a Counterpart Application, Chinese Application No. 201510217519.X, Chinese Office Action dated Oct. 8, 2018, 7 pages.
Foreign Communication From a Counterpart Application, Chinese Application No. 201510217519.X, Chinese Search Report dated Sep. 25, 2018, 2 pages.

\* cited by examiner

METHOD AND APPARATUS FOR MANAGING APPLICATION IDENTIFIER

CROSS-REFERENCE TO RELATED APPLICATIONS

This application is a continuation of International Patent Application No. PCT/CN2015/091764 filed on Oct. 12, 2015, which claims priority to Chinese Patent Application No. 201510217519.X filed on Apr. 30, 2015. The disclosures of the aforementioned applications are hereby incorporated by reference in their entireties.

TECHNICAL FIELD

The present disclosure relates to the Internet field, and in particular, to a method and an apparatus for managing an application identifier.

BACKGROUND

After over two decades of rapid development, the Internet has currently penetrated into every aspect of people's daily life, and it is difficult for people to live without the Internet.

In daily life, people can work, entertain themselves, and communicate using the Internet. For example, people register an electronic-mail (Email) account or a social account on the Internet to communicate, people register a shopping platform account or a network banking account on the Internet to shop, and people register a gaming platform account on the Internet to entertain themselves. In addition, with the rapid rise of the mobile Internet, wearable devices, and the Internet of Things, a quantity of electronic devices that are associated with or possessed by a user also increases rapidly, and the user also needs to identify and manage these devices by verifying validity of their identifiers.

It can be learned from the foregoing that people have a large quantity of accounts on the Internet, and existence of the accounts is to prove people's identity. In this case, people may submit much private information in a process of registering the large quantity of the accounts, the private information may be acquired by a hacker, and disclosure of the private information may cause a property loss of a user. Therefore, it is essential to reduce disclosure of the private information of the user while proving an identity of the user.

SUMMARY

Embodiments of the present disclosure provide a method and an apparatus for managing an application identifier, which can reduce disclosure of private information of a user while proving an identity of the user using an application identifier.

There are different application identifiers to prove people's identity when people are in different scenarios. For example, a license plate of a car can prove an identity of a user when the user has the car, the user has an Email account, and the Email account can prove an identity of the user when the user works on the Internet, the user registers an account with an electronic commerce (e-commerce) platform when the user shops on the Internet, and the registered e-commerce account can also prove an identity of the user, and a user carries a certificate such as an identity card, and the identity card is also used to prove an identity of the user when traveling. There are many scenarios in which a user needs an application identifier, which are not listed one by one herein.

In this case, a user may submit much private information in a process of registering a large quantity of application identifiers, the private information may be acquired by a hacker, and disclosure of the private information may cause a property loss of the user. Therefore, the present disclosure provides a double-layer control structure, which reduces a possibility of disclosing user information while proving validity of an application identifier. The double-layer control structure may be referred to as a Gene-General Identifier (GGID) structure.

The double-layer control structure includes a gene layer structure and an application layer structure, where information of the gene layer structure may be expressed as a Gene ID, and the Gene ID may be stored in an organization with high confidentiality.

The Gene ID is generated according to a feature identifier of a user, where the feature identifier of the user may be one or more of a gene, a fingerprint, a palm print, an iris, and a voiceprint. For example, hash processing is performed on a gene sequence to obtain a hash value, and the hash value is used as a Gene ID of the user. For example, fingerprint information is processed using a preset algorithm in order to obtain a feature string, and the feature string is used as a Gene ID of the user. There are many manners of setting the Gene ID, which are not listed one by one herein.

Information of the application layer structure may be an application identifier and associated information of the application identifier, where the application identifier may be expressed as a General ID. The General ID and/or the associated information of the General ID are/is generated according to the Gene ID. The associated information may be a private key corresponding to the General ID, and may be verified using a public key of the General ID or the General ID itself in order to prove validity of the General ID and the associated information of the General ID. An identifier management apparatus generates a new General ID and corresponding associated information according to the Gene ID only when the associated information is disclosed.

The Gene ID is not made public, and the General ID in the application layer structure may be made public. When necessary, a user may prove, with the help of the associated information of the General ID, that the General ID is obtained by a valid user from an identifier management organization.

In an embodiment of the present disclosure, an identity card number may be a General ID, and associated information corresponding to the identity card number is stored in an electronic chip of an identity card. If the identity card is lost, a General ID may be generated again using a Gene ID, and the original identity card number becomes completely invalid. For example, from information printed on a surface of the identity card, a service provider may obtain a General ID of a user, and learn basic information that may be made public, such as a name and an identity card number of the user. If a merchant wants to verify authenticity of the identity card and validity of a user identity, the merchant may use another terminal to interact with an electronic chip of the identity card. If the electronic chip can provide particular information or successfully complete a preset operation using associated information of the General ID, validity of the General ID is proved, without disclosing biometric feature information related to the Gene ID.

In an embodiment of the present disclosure, the GGID structure is applicable to trades, such as the Internet of Things, industries, and the healthcare industry. For example, a Gene ID and/or associated information of a General ID are/is hidden by storing or recording, in a physical sintering and etching manner or the like, the Gene ID and/or the associated information of the General ID in a physical module that is difficult to be disassembled and analyzed, and a product serial number or the like is used as the General ID for interaction or management. When the device is controlled by a hacker or external information of the device is refreshed, a manufacturer or a valid owner of the device may acquire, using a preset algorithm, the Gene ID and/or the associated information of the General ID that are/is difficult to be tampered in order to verify validity of the device or further control or disable the device.

In an embodiment of the present disclosure, a user registers a Gene ID with an identifier management organization, and then the user may obtain General IDs in different application scenarios according to the Gene ID. For example, an identifier management apparatus may generate or apply for an Email account as a first General ID according to the Gene ID, the identifier management apparatus may generate or apply for a WECHAT account as a second General ID according to the Gene ID, the identifier management apparatus may generate or apply for a phone number as a third General ID according to the Gene ID, the identifier management apparatus may generate or apply for a license plate of a car as a fourth General ID according to the Gene ID.

With the idea of double-layer mapping and hierarchical management of GGID, validity of an application identifier can be proved without disclosing user information. The GGID mechanism may be applied to multiple fields, and a specific description is as follows.

A first aspect of the embodiments of the present disclosure discloses a method for managing an application identifier, where the method includes receiving, by an identifier management apparatus, a request sent by a terminal to apply for a private key of an application identifier, acquiring, by the identifier management apparatus, a user identifier and the application identifier according to the request, acquiring, by the identifier management apparatus, a feature identifier of the user according to the user identifier, generating, by the identifier management apparatus, a private key of the application identifier according to the application identifier and the feature identifier of the user, and sending, by the identifier management apparatus, the private key of the application identifier to the terminal.

With reference to the first aspect, in a first possible implementation manner of the first aspect, generating, by the identifier management apparatus, a private key of the application identifier according to the application identifier and the feature identifier of the user includes performing, by the identifier management apparatus, hashing on the feature identifier of the user to obtain a first string, joining, by the identifier management apparatus, the application identifier and the first string to obtain a second string, and obtaining, by the identifier management apparatus, the private key of the application identifier according to a preset private key generation algorithm and the second string.

With reference to the first aspect, in a second possible implementation manner of the first aspect, the request includes a type of the application identifier, and generating, by the identifier management apparatus, a private key of the application identifier according to the application identifier and the feature identifier of the user includes generating, by the identifier management apparatus, the private key of the application identifier according to the application identifier, the type of the application identifier, and the feature identifier of the user.

With reference to the second possible implementation manner of the first aspect, in a third possible implementation manner of the first aspect, generating, by the identifier management apparatus, the private key of the application identifier according to the application identifier, the type of the application identifier, and the feature identifier of the user includes obtaining, by the identifier management apparatus, a third string according to the type of the application identifier and the feature identifier of the user, performing, by the identifier management apparatus, hashing on the third string according to a preset hash function to obtain a fourth string, joining, by the identifier management apparatus, the application identifier and the fourth string to obtain a fifth string, and obtaining, by the identifier management apparatus, the private key of the application identifier according to a preset private key generation algorithm and the fifth string.

With reference to the first aspect or any one of the first to the third possible implementation manners of the first aspect, in a fourth possible implementation manner of the first aspect, the request further includes a digital signature of the user, and before generating, by the identifier management apparatus, a private key of the application identifier according to the application identifier and the feature identifier of the user, the method further includes acquiring, by the identifier management apparatus, a public key of the user according to the user identifier, verifying, by the identifier management apparatus, the digital signature of the user according to the public key of the user, and generating, by the identifier management apparatus, the private key of the application identifier according to the application identifier and the feature identifier of the user when the digital signature of the user is successfully verified.

With reference to the fourth possible implementation manner of the first aspect, in a fifth possible implementation manner of the first aspect, before sending, by the identifier management apparatus, the private key of the application identifier to the terminal, the method further includes encrypting, by the identifier management apparatus, the private key of the application identifier according to the public key of the user, and sending, by the identifier management apparatus, the private key of the application identifier to the terminal includes sending, by the identifier management apparatus, the encrypted private key of the application identifier to the terminal.

With reference to the first aspect or any one of the first to the fifth possible implementation manners of the first aspect, in a sixth possible implementation manner of the first aspect, before acquiring, by the identifier management apparatus, a feature identifier of the user according to the user identifier, the method further includes receiving, by the identifier management apparatus, the user identifier and a biometric feature sent by the terminal, generating, by the identifier management apparatus, the feature identifier of the user according to a first preset algorithm and the biometric feature, and saving, by the identifier management apparatus, a correspondence between the user identifier and the feature identifier of the user, and acquiring, by the identifier management apparatus, a feature identifier of the user according to the user identifier includes acquiring, by the identifier management apparatus according to the correspondence, the feature identifier of the user corresponding to the user identifier.

With reference to the first aspect or any one of the first to the fifth possible implementation manners of the first aspect, in a seventh possible implementation manner of the first aspect, acquiring, by the identifier management apparatus, a feature identifier of the user according to the user identifier includes acquiring, by the identifier management apparatus, a biometric feature of the user from the user identifier, and generating, by the identifier management apparatus, the feature identifier of the user according to a second preset algorithm and the biometric feature of the user.

A second aspect of the embodiments of the present disclosure discloses a method for managing an application identifier, where the method includes receiving, by a terminal, a first string sent by an identifier management apparatus, where the first string is in an encrypted state, decrypting, by the terminal, the first string according to a private key of a user to acquire a second string and a private key of the application identifier from the first string, where the second string is a feature identifier obtained by means of hash processing, joining, by the terminal, the application identifier and the second string to obtain a public key of the application identifier, and verifying, by the terminal, validity of the private key of the application identifier according to the public key of the application identifier.

With reference to the second aspect, in a first possible implementation manner of the second aspect, after verifying, by the terminal, validity of the private key of the application identifier according to the public key of the application identifier, the method further includes determining, by the terminal according to an application requirement of the user, a target object with which the terminal needs to interact if the private key of the application identifier is valid, and sending, by the terminal, an interaction request to the target object, where the interaction request includes a digital signature, the application identifier, and the second string such that the target object verifies an identity of the terminal according to the second string, the application identifier, and the digital signature, where the digital signature is obtained by encrypting the second string by the terminal according to the private key of the application identifier.

With reference to the first possible implementation manner of the second aspect, in a second implementation manner of the second aspect, the digital signature further includes one or more of a type of the application identifier, an identifier of the target object, a timestamp, or a randomizer.

A third aspect of the embodiments of the present disclosure discloses an identifier management apparatus, where the apparatus includes a receiving unit configured to receive a request sent by a terminal to apply for a private key of an application identifier, an acquiring unit configured to acquire a user identifier and the application identifier of the user according to the request, where the acquiring unit is further configured to acquire a feature identifier of the user according to the user identifier, a generating unit configured to generate a private key of the application identifier according to the application identifier and the feature identifier of the user, and a sending unit configured to send the private key of the application identifier to the terminal.

With reference to the third aspect, in a first possible implementation manner of the third aspect, the generating unit includes a first hash subunit, a first joining subunit, and a first generating subunit, where the first hash subunit is configured to perform hashing on the feature identifier of the user to obtain a first string. The first joining subunit is configured to join the application identifier and the first string to obtain a second string, and the first generating subunit is configured to obtain the private key of the application identifier according to a preset private key generation algorithm and the second string.

With reference to the third aspect, in a second possible implementation manner of the third aspect, the request includes a type of the application identifier, and the generating unit is further configured to generate the private key of the application identifier according to the application identifier, the type of the application identifier, and the feature identifier of the user.

With reference to the second possible implementation manner of the third aspect, in a third possible implementation manner of the third aspect, the generating unit includes a combination subunit, a second hash subunit, a second joining subunit, and a second generating subunit, where the combination subunit is configured to obtain a third string according to the type of the application identifier and the feature identifier of the user. The second hash subunit is configured to perform hashing on the third string according to a preset hash function to obtain a fourth string. The second joining subunit is configured to join the application identifier and the fourth string to obtain a fifth string, and the second generating subunit is configured to obtain the private key of the application identifier according to a preset private key generation algorithm and the fifth string.

With reference to the third aspect or any one of the first to the third possible implementation manners of the third aspect, in a fourth possible implementation manner of the third aspect, the request includes a digital signature of the user, and the apparatus further includes a verification unit, where the acquiring unit is configured to acquire a public key of the user according to the user identifier. The verification unit is configured to verify the digital signature of the user according to the public key of the user, and the generating unit is configured to generate the private key of the application identifier according to the application identifier and the feature identifier of the user when the digital signature of the user is successfully verified.

With reference to the fourth possible implementation manner of the third aspect, in a fifth possible implementation manner of the third aspect, the apparatus further includes an encryption unit, where the encryption unit is configured to encrypt the private key of the application identifier according to the public key of the user, and the sending unit is configured to send the encrypted private key of the application identifier to the terminal.

With reference to the third aspect or any one of the first to the fifth possible implementation manners of the third aspect, in a sixth possible implementation manner of the third aspect, the apparatus further includes a saving unit, where the receiving unit is configured to receive the user identifier and a biometric feature that are sent by the terminal. The generating unit is further configured to generate the feature identifier of the user according to a first preset algorithm and the biometric feature. The saving unit is configured to save a correspondence between the user identifier and the feature identifier of the user, and the acquiring unit is configured to acquire, according to the correspondence, the feature identifier of the user corresponding to the user identifier.

With reference to the third aspect or any one of the first to the fifth possible implementation manners of the third aspect, in a seventh possible implementation manner of the third aspect, the acquiring unit includes an acquiring subunit and a generating subunit, where the acquiring subunit is configured to acquire a biometric feature of the user from the user identifier, and the generating subunit is configured to generate the feature identifier of the user according to a second preset algorithm and the biometric feature of the user.

A fourth aspect of the embodiments of the present disclosure discloses a terminal, where the terminal includes a receiving unit configured to receive a first string sent by an identifier management apparatus, where the first string is in an encrypted state, a decryption unit configured to decrypt the first string according to a private key of a user to acquire a second string and a private key of the application identifier from the first string, where the second string is a feature identifier obtained by means of hash processing, a joining unit configured to join the application identifier and the second string to obtain a public key of the application identifier, and a verification unit configured to verify validity of the private key of the application identifier according to the public key of the application identifier.

With reference to the fourth aspect, in a first possible implementation manner of the fourth aspect, the terminal further includes a determining unit and a sending unit, where the determining unit is configured to determine, by the terminal according to an application requirement of the user, a target object with which the terminal needs to interact if the private key of the application identifier is valid, and the sending unit sends an interaction request to the target object, where the interaction request includes a digital signature, the application identifier, and the second string such that the target object verifies an identity of the terminal according to the second string, the application identifier, and the digital signature, where the digital signature is obtained by encrypting the second string by the terminal according to the private key of the application identifier.

With reference to the first possible implementation manner of the fourth aspect, in a second possible implementation manner of the fourth aspect, the digital signature further includes one or more of a type of the application identifier, an identifier of the target object, a timestamp, or a randomizer.

With reference to the first aspect and the third aspect, it may be learned that, according to the method for managing an application identifier provided in the embodiments of the present disclosure, an identifier management apparatus generates a private key of an application identifier according to the application identifier and a feature identifier of a user. There exists a correspondence between the private key of the application identifier and the application identifier. Therefore, when the user encrypts communication content using the private key of the application identifier, a communication peer determines, by verifying validity of the private key of the application identifier, whether the application identifier is acquired by a valid user from a trustworthy organization. In this way, security of the communication content is ensured while a risk of disclosing user privacy is reduced.

With reference to the second aspect and the fourth aspect, it may be learned that, according to the method for managing an application identifier provided in the embodiments of the present disclosure, a terminal verifies validity of a private key of an application identifier according to a public key of the application identifier, where the public key of the application identifier is generated according to a feature identifier and the application identifier. If the private key of the application identifier is valid, when the terminal communicates with an interaction object, the interaction object can prove, by verifying the private key of the application identifier, that the application identifier is authenticated by a trustworthy organization, and the application identifier is reliable. This also reduces a possibility of disclosing private information.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
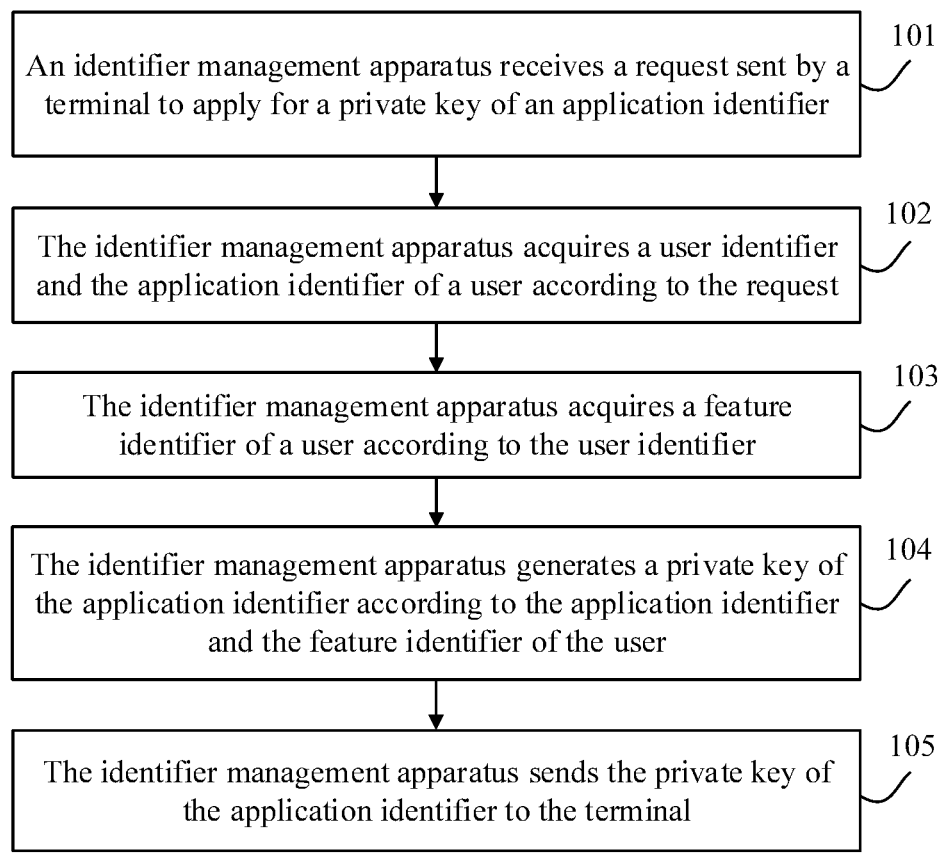
FIG. 1 is a flowchart of a method for managing an application identifier according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

There are different application identifiers to prove people's identity when people are in different scenarios. For example, a license plate of a car can prove an identity of a user when the user has the car, the user has an Email account, and the Email account can prove an identity of the user when the user works on the Internet, the user registers an account with an e-commerce platform when the user shops on the Internet, and the registered e-commerce account can also prove an identity of the user, and a user carries a certificate such as an identity card, and the identity card proves an identity of the user when traveling. There are many scenarios in which a user needs an application identifier, which are not listed one by one herein.

In this case, a user may submit much private information in a process of registering a large quantity of application identifiers, the private information may be acquired by a hacker, and disclosure of the private information may cause a property loss of the user. Therefore, the present disclosure provides a double-layer control structure, which reduces a possibility of disclosing user information while proving validity of an application identifier. The double-layer control structure may be referred to as a GGID structure.

The double-layer control structure includes a gene layer structure and an application layer structure, where information of the gene layer structure may be expressed as a Gene ID, and the Gene ID may be stored in an organization with high confidentiality.

The Gene ID is generated according to a feature identifier of a user, where the feature identifier of the user may be one or more of a gene, a fingerprint, a palm print, an iris, and a voiceprint. For example, hash processing is performed on a gene sequence to obtain a hash value, and the hash value is used as a Gene ID of the user. For example, fingerprint information is processed using a preset algorithm, to obtain a feature string, and the feature string is used as a Gene ID of the user. There are many manners of setting the Gene ID, which are not listed one by one herein.

Information of the application layer structure may be an application identifier and associated information of the application identifier, where the application identifier may be expressed as a General ID. The General ID and/or the associated information of the General ID are/is generated according to the Gene ID. The associated information may be a private key corresponding to the General ID, and may be verified using a public key of the General ID or the General ID itself in order to prove validity of the General ID and the associated information of the General ID. An identifier management apparatus generates a new General ID and corresponding associated information according to the Gene ID only when the associated information is disclosed.

The Gene ID is not made public, and the General ID in the application layer structure may be made public. When necessary, a user may prove, with the help of the associated information of the General ID, that the General ID is obtained by a valid user from an identifier management organization.

In an embodiment of the present disclosure, an identity card number may be a General ID, and associated information corresponding to the identity card number is stored in an electronic chip of an identity card. If the identity card is lost, a General ID may be generated again using a Gene ID, and the original identity card number becomes completely invalid. For example, from information printed on a surface of the identity card, a service provider may obtain a General ID of a user, and learn basic information that may be made public, such as a name and an identity card number of the user. If a merchant wants to verify authenticity of the identity card and validity of a user identity, the merchant may use another terminal to interact with an electronic chip of the identity card. If the electronic chip can provide particular information or successfully complete a preset operation using associated information of the General ID, validity of the General ID is proved, without disclosing biometric feature information related to the Gene ID.

In an embodiment of the present disclosure, the GGID structure is applicable to trades, such as the Internet of Things, industries, and the healthcare industry. For example, a Gene ID and/or associated information of a General ID are/is hidden by storing or recording, in a physical sintering and etching manner or the like, the Gene ID and/or the associated information of the General ID in a physical module that is difficult to be disassembled and analyzed, and a product serial number or the like is used as the General ID for interaction or management. When the device is controlled by a hacker or external information of the device is refreshed, a manufacturer or a valid owner of the device may acquire, using a preset algorithm, the Gene ID and/or the associated information of the General ID that are/is difficult to be tampered in order to verify validity of the device or further control or disable the device.

In an embodiment of the present disclosure, a user registers a Gene ID with an identifier management organization, and then the user may obtain General IDs in different application scenarios according to the Gene ID. For example, an identifier management apparatus may generate or apply for an Email account as a first General ID according to the Gene ID, the identifier management apparatus may generate or apply for a WECHAT account as a second General ID according to the Gene ID, the identifier management apparatus may generate or apply for a phone number as a third General ID according to the Gene ID, the identifier management apparatus may generate or apply for a license plate of a car as a fourth General ID according to the Gene ID.

With the idea of double-layer mapping and hierarchical management of GGID, validity of an application identifier can be proved without disclosing user information. The GGID mechanism may be applied to multiple fields, and a specific description is as follows.

The following describes a method for managing an application identifier in an embodiment of the present disclosure according to FIG. 1. According to the method provided in this embodiment, a private key of an application identifier may be generated according to the application identifier and a feature identifier of a user. The private key of the application identifier is generated by an identifier management apparatus, and communication information is encrypted using the private key of the application identifier. If the information encrypted using the private key of the application identifier is successfully verified by a communication peer, not only validity of the application identifier can be proved, but also a possibility of disclosing private information of the user is reduced. The method includes steps 101 to 105.

Step 101: An identifier management apparatus receives a request sent by a terminal to apply for a private key of an application identifier.

The identifier management apparatus is a center for generating a private key of an application identifier and a center for managing the private key of the application identifier on the Internet. The Internet of Things may be considered as a part of the Internet.

The request to apply for a private key of an application identifier is sent by a user using the terminal.

Step 102: The identifier management apparatus acquires a user identifier and the application identifier of a user according to the request.

A private key of the application identifier is a private key generated according to the application identifier.

The user identifier refers to an identifier used for uniquely identifying a user identity. For example, the user identifier may be an identity card number of a user, or may be an identifier generated according to a physiological feature. Types of the user identifier are not listed one by one herein.

In an embodiment of the present disclosure, the request used to apply for a private key of an application identifier may include the user identifier and the application identifier, that is, the identifier management apparatus may directly extract the user identifier and the application identifier from the request, where the application identifier may be a string set by the user.

In another embodiment of the present disclosure, the request used to apply for a private key of an application identifier may include the user identifier. After acquiring the user identifier from the request, the identifier management apparatus acquires the application identifier of the user according to the user identifier, where the application identifier may be pre-allocated to the user by the identifier management apparatus. For example, the identifier management apparatus allocates the application identifier to the user when the user registers with the identifier management apparatus.

Step 103: The identifier management apparatus acquires a feature identifier of the user according to the user identifier.

The feature identifier is obtained according to the physiological feature of the user. Common physiological features include a gene, an iris, a fingerprint, a palm print, a voiceprint, and the like.

In an embodiment of the present disclosure, the identifier management apparatus saves a correspondence between the user identifier and the feature identifier of the user.

In another embodiment of the present disclosure, the identifier management apparatus may acquire the physiological feature of the user from the user identifier, and then generate the feature identifier according to a preset algorithm and the physiological feature of the user. For example, the preset algorithm may be a hash function.

Step 104: The identifier management apparatus generates a private key of the application identifier according to the application identifier and the feature identifier of the user.

In an embodiment of the present disclosure, because the application identifier is authenticated by an identifier management center, the application identifier may be equivalent to an identity card of the user without exposing private information of the user. Therefore, when the user registers with another website or application, only validity of the private key of the application identifier needs to be verified. If the private key of the application identifier is valid, it proves that the application identifier is also valid.

Step 105: The identifier management apparatus sends the private key of the application identifier to the terminal.

In an embodiment of the present disclosure, the identifier management apparatus may encrypt the private key of the application identifier, and then send the encrypted private key of the application identifier to the terminal in order to improve security in a transmission process of the private key of the application identifier.

It may be learned from the foregoing that, according to the method for managing an application identifier provided in this embodiment of the present disclosure, an identifier management apparatus generates a private key of an application identifier according to the application identifier and a feature identifier of a user. There exists a correspondence between the private key of the application identifier and the application identifier. Therefore, when the user encrypts communication content using the private key of the application identifier, a communication peer determines, by verifying validity of the private key of the application identifier, whether the application identifier is acquired by a valid user from a trustworthy organization. In this way, security of the communication content is ensured while a risk of user privacy disclosure is reduced.

In an embodiment of the present disclosure, when a communication peer receives, from a user, an application identifier and information encrypted using a private key of the application identifier, the communication peer verifies the encrypted information using a public key of the application identifier. If the encrypted information is successfully verified, it proves that the application identifier is obtained by a valid user from an identifier management apparatus and is reliable. In this way, a possibility of disclosing private information of the user is reduced while identity authentication is completed.

In an embodiment of the present disclosure, the feature identifier of the user belongs to the private information of the user, and cannot be directly sent or used in an insecure environment or channel. The application identifier of the user is public information, and can be directly and publicly used. The private key of the application identifier is generated according to the application identifier and the feature identifier. It is proved, by verifying validity of the private key of the application identifier, that the application identifier is authenticated and generated for a valid user by a trustworthy organization.

For example, genetic information of the user may be the private information, and a phone number of the user is the public information. The private key of the application identifier is generated according to the genetic information of the user and the phone number of the user.

For example, iris information, fingerprint information, and palm print information of the user may be the private information, and an Email account and a license plate number of the user may be application identifiers.

Optionally, in the foregoing method for managing an application identifier, step 104 further includes step 1041 to step 1043 (not shown).

Step 1041: The identifier management apparatus performs hashing on the feature identifier of the user to obtain a first string.

The feature identifier of the user is a string.

A hash algorithm may be a common hash algorithm, such as MD2, MD4, MD5, SHA-1, or SHA-256. There are many hash algorithms, which are not listed one by one or limited herein.

Step 1042: The identifier management apparatus joins the application identifier and the first string to obtain a second string.

In an embodiment of the present disclosure, the identifier management apparatus may perform joining by placing the application identifier in front of the first string in order to obtain the second string, or the identifier management apparatus may perform joining by placing the application identifier behind the first string in order to obtain the second string. Examples are not listed one by one herein.

In an embodiment of the present disclosure, the identifier management apparatus may distribute the application identifier in the second string.

Step 1043: The identifier management apparatus obtains the private key of the application identifier according to a preset private key generation algorithm and the second string.

The preset private key generation algorithm may be a private key generation algorithm part in an existing Identity-based Encryption (IBE) scheme, such as the Boneh Franklin scheme (BF-IBE), the Sakai-Kasahara scheme (SK-IBE), and the Boneh-Boyen scheme (BB-IBE). There are many IBE schemes, which are not listed one by one or limited herein.

The second string is a public key, and the second string and the private key of the application identifier constitute a key pair. In an embodiment of the present disclosure, the private key of the application identifier is generated using the identifier management apparatus, and user information is recorded in detail in the identifier management apparatus. For example, there are two communication parties currently, and a first party encrypts information using a private key of an application identifier. If a second party can decrypt the information using a public key of the application identifier of the first party, it proves that the information is sent by the first party, because an identity of the first party is authenticated by an identifier management organization. It may be learned from the foregoing that, before the first party communicates with the second party, the second party may not need to verify the identity of the first party, because an identity of a peer party can be learned provided that information encrypted using a private key of an application identifier of the peer party can be decrypted using a public key of the application identifier of the peer party. For example, the second party may save a direct correspondence between the application identifier of the first party and the public key of the application identifier, and the second party may query, in an identifier management apparatus, identity information of the first party using the application identifier of the first party.

Optionally, in the foregoing method for managing an application identifier, the request used to apply for a private key of an application identifier includes a type of the application identifier, and step 104 further includes generating, by the identifier management apparatus, the private key of the application identifier according to the application identifier, the type of the application identifier, and the feature identifier of the user.

The type of the application identifier is related to an application scenario. The type of the application identifier may be classified into multiple categories, where each category may further include multiple sub-categories. For example, the application identifier may be a registered account of a social category, may be a serial number of a refrigerator of a home appliance category, may be a license plate number of a car of a machinery category, or may be a serial number of a wearable device of an electronic device category. Categories of the application identifier are not listed one by one herein.

When sending the request used to apply for a private key of an application identifier to the identifier management apparatus, the user may fill in the type of the application identifier, or may select a type required by the user from types of an application identifier provided in the identifier management apparatus.

The identifier management apparatus may determine a length and a format of the private key of the application identifier according to the type of the application identifier.

Figure 2:
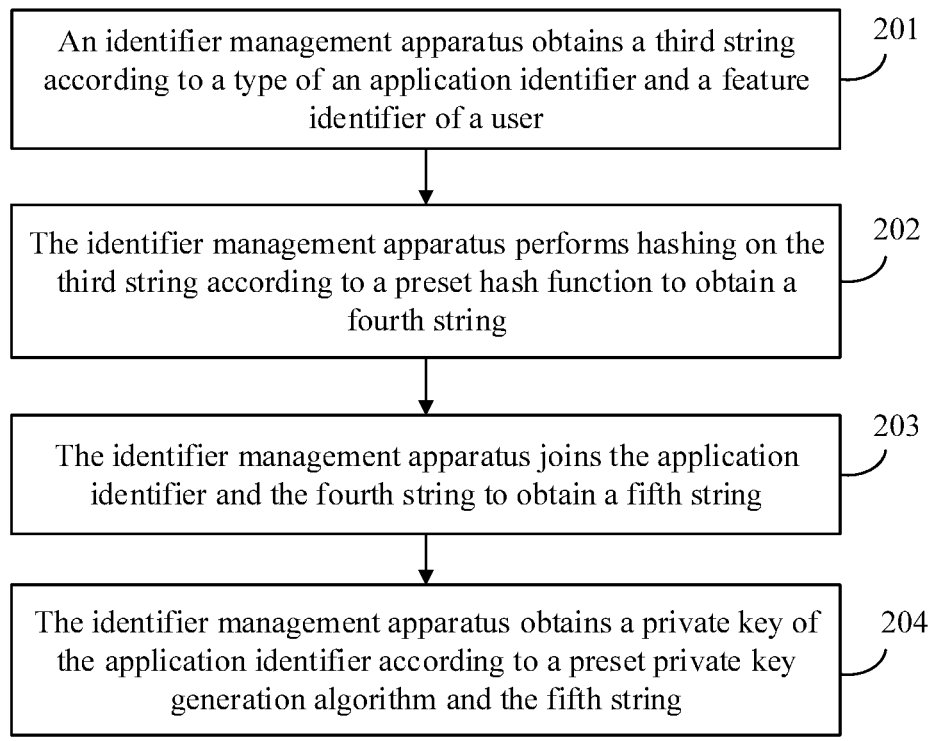
FIG. 2 is a flowchart of a method for managing an application identifier according to another embodiment of the present disclosure.

As shown in FIG. 2, in an embodiment of the present disclosure, specific details of generating, by the identifier management apparatus, the private key of the application identifier according to the type of the application identifier, the application identifier, and the feature identifier of the user include the following steps.

Step 201: The identifier management apparatus obtains a third string according to the type of the application identifier and the feature identifier of the user.

The identifier management apparatus may sequentially join the type of the application identifier and the application identifier in a front-to-back sequence to obtain the third string, or may perform joining in a back-to-front sequence to obtain the third string. A joining sequence is not limited herein.

Step 202: The identifier management apparatus performs hashing on the third string according to a preset hash function to obtain a fourth string.

A hash algorithm may be a common hash algorithm, such as MD2, MD4, MD5, SHA-1, or SHA-256. There are many hash algorithms, which are not listed one by one or limited herein.

Step 203: The identifier management apparatus joins the application identifier and the fourth string to obtain a fifth string, where the identifier management apparatus may sequentially join the application identifier and the fourth string in a front-to-back sequence to obtain the fifth string, or may perform joining in a back-to-front sequence, and a joining sequence is not limited herein.

Step 204: The identifier management apparatus obtains the private key of the application identifier according to a preset private key generation algorithm and the fifth string.

The preset private key generation algorithm may be a private key generation algorithm part in an existing IBE scheme, such as the BF-IBE, the SK-IBE, and the BB-IBE. There are many IBE schemes, which are not listed one by one or limited herein.

Figure 3:
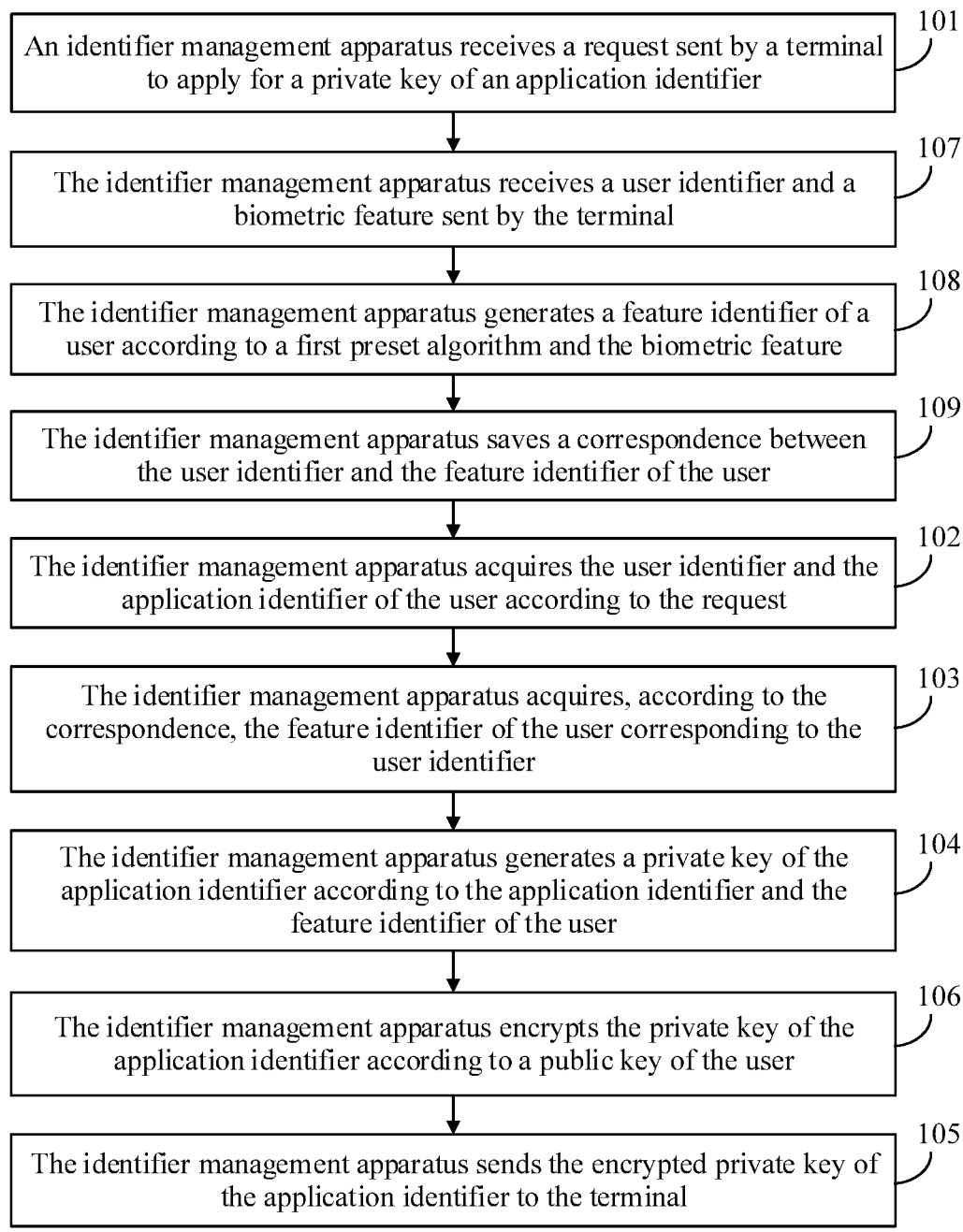
FIG. 3 is a flowchart of a method for managing an application identifier according to another embodiment of the present disclosure.

As shown in FIG. 3, optionally, in another embodiment of the present disclosure, before step 105, the method further includes the following steps.

Step 106: The identifier management apparatus encrypts the private key of the application identifier according to a public key of the user.

The public key of the user may be saved in the identifier management apparatus when the user registers with the identifier management apparatus such that the identifier management apparatus encrypts the private key of the application identifier using the public key of the user.

Step 105 that the identifier management apparatus sends the private key of the application identifier to the terminal further includes sending, by the identifier management apparatus, the encrypted private key of the application identifier to the terminal.

As shown in FIG. 3, optionally, in another embodiment of the present disclosure, the request to apply for a private key of an application identifier further includes a digital signature of the user.

Before step 104 that the identifier management apparatus generates a private key of the application identifier according to the application identifier and the feature identifier of the user, the method further includes acquiring, by the identifier management apparatus, a public key of the user according to the user identifier, and verifying, by the identifier management apparatus, the digital signature of the user according to the public key of the user.

Step 103 further includes generating, by the identifier management apparatus, the private key of the application identifier according to the application identifier and the feature identifier of the user when the digital signature of the user is successfully verified.

As shown in FIG. 3, optionally, in another embodiment of the present disclosure, before step 102, the method further includes the following steps.

Step 107: The identifier management apparatus receives the user identifier and a biometric feature sent by the terminal.

The user identifier may uniquely identify a user identity, for example, an identity card number.

Step 108: The identifier management apparatus generates the feature identifier of the user according to a first preset algorithm and the biometric feature.

The first preset algorithm may be an encryption algorithm. Common encryption algorithms include an MD5 algorithm, an RSA algorithm, and the like.

The biometric feature may be a fingerprint, an iris, a gene, or the like. For example, if the biometric feature is a fingerprint, sampling may be performed on the fingerprint, and a sampling result is identified using a string.

Step 109: The identifier management apparatus saves a correspondence between the user identifier and the feature identifier of the user.

Step 103 further includes acquiring, by the identifier management apparatus according to the correspondence, the feature identifier of the user corresponding to the user identifier.

Optionally, in another embodiment of the present disclosure, step 103 further includes the following steps (not shown).

Step 1031: The identifier management apparatus acquires a biometric feature of the user from the user identifier.

The user identifier may include the biometric feature of the user, such as a fingerprint feature, a gene feature, or an iris feature. The identifier management apparatus may extract the biometric feature of the user from the user identifier, and identify the biometric feature of the user in a form of a string. There are many methods for extracting the biometric feature, which are not listed one by one herein.

Step 1032: The identifier management apparatus generates the feature identifier of the user according to a second preset algorithm and the biometric feature of the user.

The second preset algorithm may be a common encryption algorithm, such as an MD5 algorithm or an RSA algorithm. Common encryption algorithms are not listed one by one herein.

Figure 4:
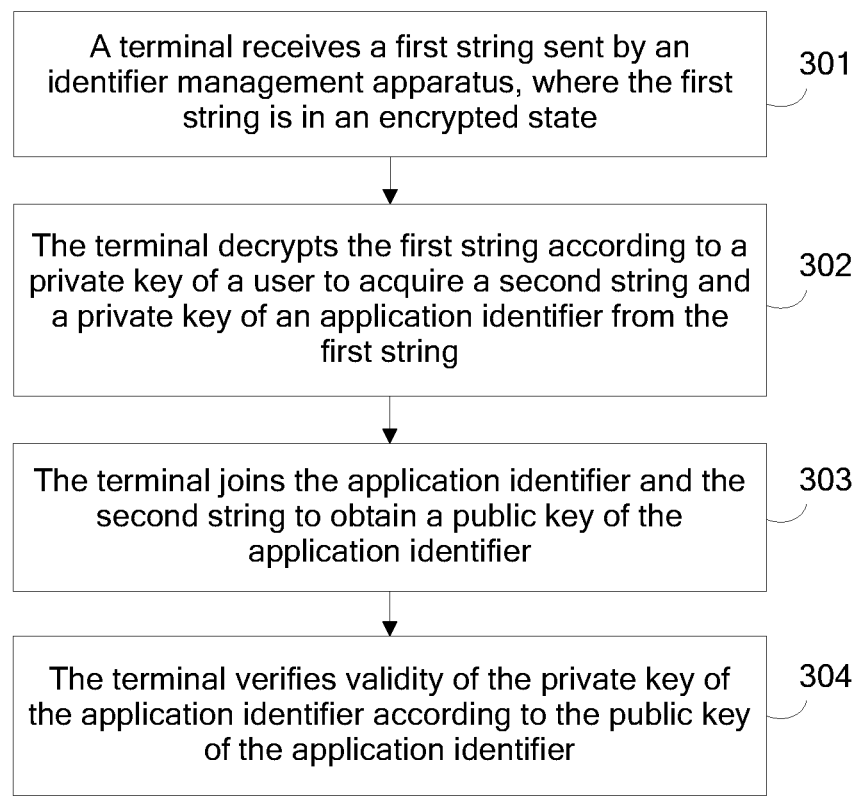
FIG. 4 is a flowchart of a method for managing an application identifier according to another embodiment of the present disclosure.

As shown in FIG. 4, FIG. 4 is a method for managing an application identifier provided in the present disclosure, where the method includes the following steps.

Step 301: A terminal receives a first string sent by an identifier management apparatus, where the first string is in an encrypted state.

The identifier management apparatus encrypts a private key of an application identifier using a public key of a user, and sends the encrypted private key of the application identifier to the terminal.

Step 302: The terminal decrypts the first string according to a private key of a user to acquire a second string and a private key of an application identifier from the first string, where the second string is a feature identifier obtained by means of hash processing.

The feature identifier may be information such as a fingerprint, a voiceprint, an iris, a gene sequence, and a palm print.

In another embodiment of the present disclosure, hash processing is performed on the feature identifier, and then a feature identifier obtained by means of hash processing and the application identifier are joined to obtain the second string.

Step 303: The terminal joins the application identifier and the second string to obtain a public key of the application identifier.

Step 304: The terminal verifies validity of the private key of the application identifier according to the public key of the application identifier.

In an embodiment of the present disclosure, the second string and the application identifier constitute the public key of the application identifier, and content encrypted using the private key of the application identifier is decrypted using the public key of the application identifier. If the content encrypted using the private key of the application identifier is successfully decrypted, it proves that the private key of the application identifier is valid.

It may be learned from the foregoing that, according to the method for managing an application identifier provided in this embodiment of the present disclosure, the terminal verifies validity of a private key of an application identifier according to a public key of the application identifier. If the private key of the application identifier is valid, when the terminal communicates with an interaction object, the interaction object can prove, by verifying the private key of the application identifier, that the application identifier is authenticated by a trustworthy organization, and the application identifier is reliable. This also reduces a possibility of disclosing private information.

Optionally, in another embodiment of the present disclosure, after step 304, the method further includes the following steps (not shown in the FIG. 4).

Step 305: The terminal determines, according to an application requirement of the user, a target object with which the terminal needs to interact if the private key of the application identifier is valid.

The terminal may prompt the user to enter information, and determine a requirement of the user according to the information entered by the user if the private key of the application identifier is valid.

The target object with which the terminal needs to interact may be another terminal, may be a server, or the like.

Step 306: The terminal sends an interaction request to the target object, where the interaction request includes a digital signature, the application identifier, and the second string such that the target object verifies an identity of the terminal according to the second string, the application identifier, and the digital signature, where the digital signature is obtained by encrypting the second string by the terminal according to the private key of the application identifier.

The digital signature includes one or more of a type of the application identifier, an identifier of the target object, a timestamp, or a randomizer. The timestamp proves a validity period of communication information. The randomizer enhances security of an encryption information. The type of the application identifier is used to indicate an application scope of the private key of the application identifier.

In another embodiment of the present disclosure, the interaction request further includes the application identifier of the terminal such that the target object identifies the terminal using the application identifier.

In an embodiment of the present disclosure, a digital signature of an identifier certificate of the user further includes an identifier and a timestamp of a target server, which can prove an object of the communication and a validity period of information of the communication, thereby improving security of the communication.

Figure 5:
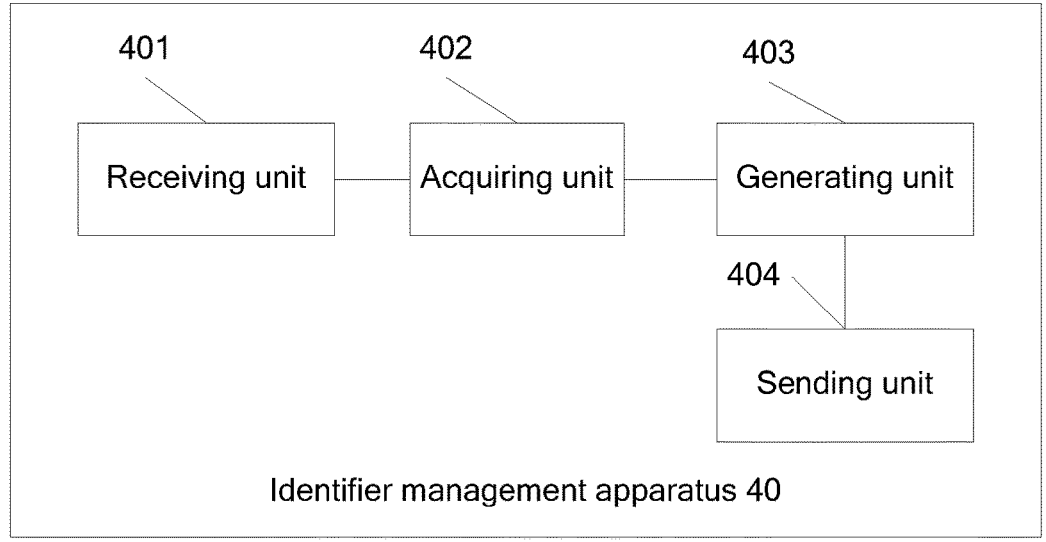
FIG. 5 is a structural diagram of an identifier management apparatus according to an embodiment of the present disclosure.

The following describes an identifier management apparatus 40 for managing an application identifier in an embodiment of the present disclosure according to FIG. 5. The identifier management apparatus 40 is a center for generating a private key of an application identifier and a center for managing the private key of the application identifier on the Internet.

The identifier management apparatus 40 is configured to execute the method described in step 101 to step 105. The identifier management apparatus 40 includes a receiving unit 401, an acquiring unit 402, a generating unit 403, and a sending unit 404.

The receiving unit 401 is configured to receive a request sent by a terminal to apply for a private key of an application identifier.

The identifier management apparatus 40 is a center for generating a private key of an application identifier and a center for managing the private key of the application identifier on the Internet.

The acquiring unit 402 is configured to acquire a user identifier and an application identifier according to the request.

The user identifier refers to an identifier that uniquely identifies an identity of the user. For example, the user identifier may be an identity card number of a user, or may be an identifier generated according to a physiological feature. Types of the user identifier are not listed one by one herein.

The request to apply for a private key of an application identifier may include the user identifier and the application identifier, and the acquiring unit 402 directly acquires the user identifier and the application identifier from the request, where the application identifier may be a string set by the user.

The request may include the user identifier, and after acquiring the user identifier from the request, the acquiring unit 402 acquires the application identifier of the user according to the user identifier, where the application identifier may be pre-allocated to the user by the identifier management apparatus 40. For example, when the user registers with the identifier management apparatus 40, the identifier management apparatus 40 allocates the application identifier to the user.

The acquiring unit 402 is further configured to acquire a feature identifier of the user according to the user identifier.

The feature identifier is obtained according to the physiological feature of the user. Common physiological features include a gene, an iris, a fingerprint, a palm print, a voiceprint, and the like.

In an embodiment of the present disclosure, the identifier management apparatus 40 saves a correspondence between the user identifier and the feature identifier of the user.

The generating unit 403 is configured to generate a private key of the application identifier according to the application identifier and the feature identifier of the user.

In an embodiment of the present disclosure, because the private key of the application identifier is authenticated by an identifier management center, information encrypted using the private key of the application identifier can prove a user identity without exposing private information of the user.

The sending unit 404 is configured to send the private key of the application identifier to the terminal.

The identifier management apparatus 40 may encrypt the private key of the application identifier, and then send the encrypted private key of the application identifier to the terminal in order to improve security in a transmission process of the private key of the application identifier.

It may be learned from the foregoing that, according to the identifier management apparatus 40 provided in this embodiment of the present disclosure, a private key of an application identifier can be generated according to the application identifier and a feature identifier of a user. There exists a correspondence between the private key of the application identifier and the application identifier. Therefore, when the user encrypts communication content using the private key of the application identifier, a communication peer determines, by verifying validity of the private key of the application identifier, whether the application identifier is acquired by a valid user from a trustworthy organization. In this way, security of the communication content is ensured while a risk of disclosing user privacy is reduced.

Optionally, based on the foregoing apparatus embodiment, in another apparatus embodiment of the present disclosure, the generating unit 403 includes a first hash subunit (not shown), a first joining subunit (not shown), and a first generating subunit (not shown).

The first hash subunit is configured to perform hashing on the feature identifier of the user to obtain a first string.

A hash algorithm may be a common hash algorithm, such as MD2, MD4, MD5, SHA-1, or SHA-256. There are many hash algorithms, which are not listed one by one or limited herein.

A format and a length of the first string are not limited.

The first joining subunit is configured to join the application identifier and the first string to obtain a second string.

In an embodiment of the present disclosure, the first joining subunit may perform joining by placing the application identifier in front of the first string, or the first joining subunit may perform joining by placing the application identifier behind the first string. Examples are not listed one by one herein.

The first generating subunit is configured to obtain the private key of the application identifier according to a preset private key generation algorithm and the second string.

The preset private key generation algorithm may be a private key generation algorithm part in an existing IBE scheme, such as the BF-IBE, the SK-IBE, and the BB-IBE. There are many IBE schemes, which are not listed one by one or limited herein.

Optionally, based on the foregoing apparatus embodiment, in another apparatus embodiment of the present disclosure, the request used to apply for a private key of an application identifier includes a type of the application identifier.

The generating unit 403 is further configured to generate the private key of the application identifier according to the application identifier, the type of the application identifier, and the feature identifier of the user.

The type of the application identifier is related to an application scenario. The type of the application identifier may be classified into multiple categories, where each category may further include multiple sub-categories. For example, the application identifier may be a registered account of a social category, may be a serial number of a refrigerator of a home appliance category, may be a license plate number of a car of a machinery category, or may be a serial number of a wearable device of an electronic device category. Categories of the application identifier are not listed one by one herein.

When sending the request used to apply for a private key of an application identifier to the identifier management apparatus, the user may fill in the type of the application identifier, or may select a type required by the user from types of an application identifier provided in the identifier management apparatus.

Optionally, based on the foregoing apparatus embodiment, in another apparatus embodiment of the present disclosure, the generating unit 403 includes a combination subunit (not shown), a second hash subunit (not shown), a second joining subunit (not shown), and a second generating subunit (not shown).

The combination subunit is configured to obtain a third string according to the type of the application identifier and the feature identifier of the user.

A length and a format of the third string are not limited.

The second hash subunit is configured to perform hashing on the third string according to a preset hash function to obtain a fourth string.

A hash algorithm may be a common hash algorithm, such as MD2, MD4, MD5, SHA-1, or SHA-256. There are many hash algorithms, which are not listed one by one or limited herein.

The second joining subunit is configured to join the application identifier and the fourth string to obtain a fifth string.

The identifier management apparatus 40 may sequentially join the application identifier and the fourth string in a front-to-back sequence to obtain the fifth string, or may perform joining in a back-to-front sequence. A joining sequence is not limited herein.

The second generating subunit is configured to obtain the private key of the application identifier according to a preset private key generation algorithm and the fifth string.

Figure 6:
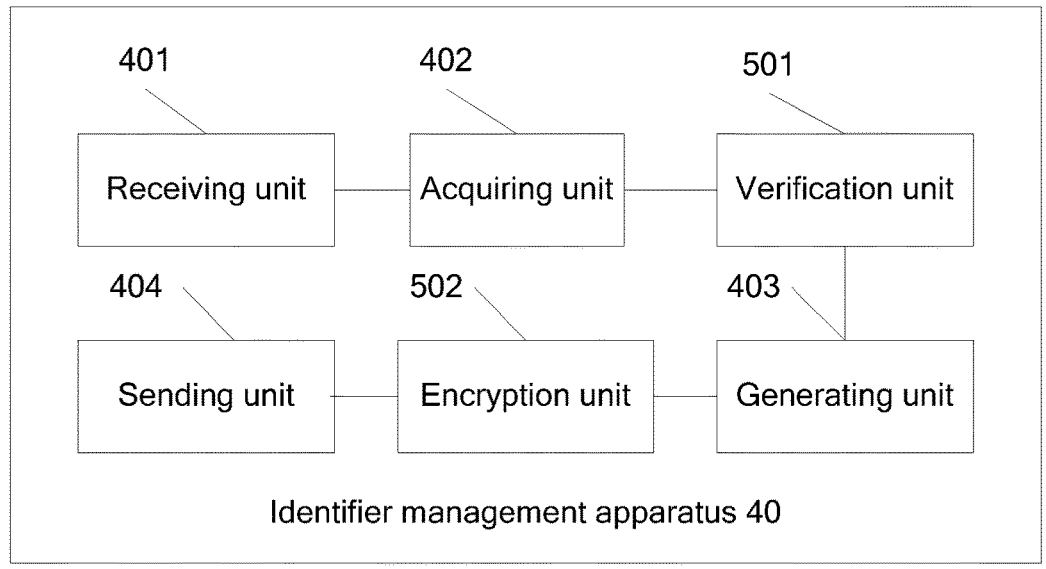
FIG. 6 is a structural diagram of an identifier management apparatus according to another embodiment of the present disclosure.

As shown in FIG. 6, optionally, based on the foregoing apparatus embodiment, in another apparatus embodiment of the present disclosure, the request to apply for a private key of an application identifier includes a digital signature of the user, and the identifier management apparatus 40 further includes a verification unit 501.

The acquiring unit 402 is configured to acquire a public key of the user according to the user identifier.

The verification unit 501 is configured to verify the digital signature of the user according to the public key of the user.

The generating unit 403 is further configured to generate the private key of the application identifier according to the application identifier and the feature identifier of the user when the digital signature of the user is successfully verified.

Optionally, based on the foregoing apparatus embodiment, in another apparatus embodiment of the present disclosure, the identifier management apparatus 40 further includes an encryption unit 502.

The encryption unit 502 is configured to encrypt the private key of the application identifier according to the public key of the user.

The sending unit 404 is further configured to send the encrypted private key of the application identifier to the terminal.

Optionally, based on the foregoing apparatus embodiment, in another apparatus embodiment of the present disclosure, the apparatus further includes a saving unit (not shown).

The receiving unit 401 is configured to receive the user identifier and a biometric feature that are sent by the terminal.

The generating unit 403 is further configured to generate the feature identifier of the user according to a first preset algorithm and the biometric feature.

The first preset algorithm may be an encryption algorithm. Common encryption algorithms include an MD5 algorithm, an RSA algorithm, and the like.

The saving unit is configured to save a correspondence between the user identifier and the feature identifier of the user.

The acquiring unit 402 is further configured to acquire, according to the correspondence, the feature identifier of the user corresponding to the user identifier.

Optionally, based on the foregoing apparatus embodiment, in another apparatus embodiment of the present disclosure, the acquiring unit 402 includes an acquiring subunit (not shown) and a generating subunit (not shown).

The acquiring subunit is configured to acquire a biometric feature of the user from the user identifier.

The generating subunit is configured to generate the feature identifier of the user according to a second preset algorithm and the biometric feature of the user.

The second preset algorithm may be a common encryption algorithm, such as an MD5 algorithm or an RSA algorithm. Common encryption algorithms are not listed one by one herein.

Figure 7:
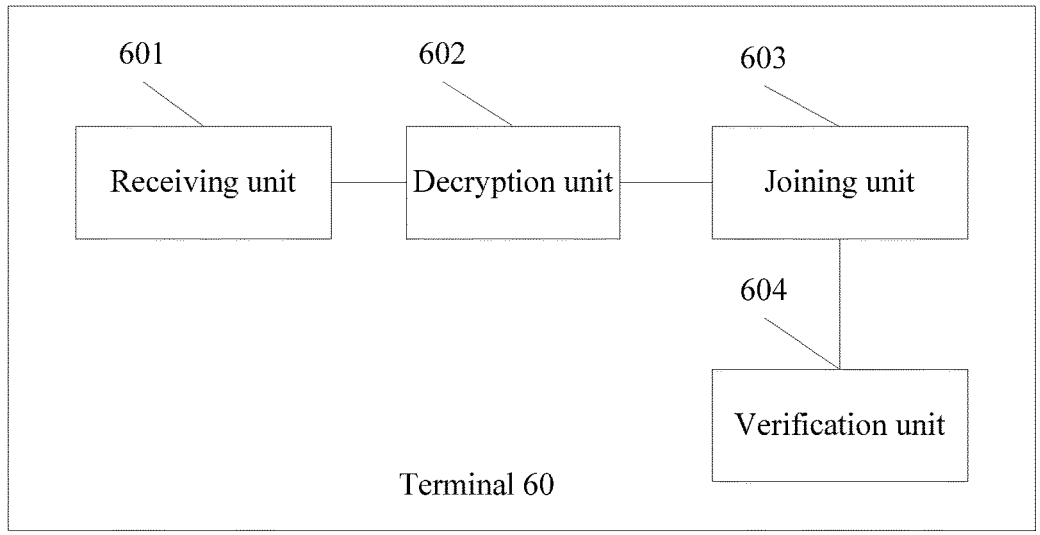
FIG. 7 is a structural diagram of a terminal according to an embodiment of the present disclosure.

The following describes a terminal 60 in an embodiment of the present disclosure according to FIG. 7. The terminal 60 is configured to execute the method described in step 301 to step 304. The terminal 60 includes a receiving unit 601, a decryption unit 602, a joining unit 603, and a verification unit 604.

The receiving unit 601 is configured to receive a first string sent by an identifier management apparatus, where the first string is in an encrypted state.

The identifier management apparatus encrypts a private key of an application identifier using a public key of the user, and sends the encrypted private key of the application identifier to the terminal 60.

The decryption unit 602 is configured to decrypt the first string according to a private key of a user to acquire a second string and a private key of the application identifier from the first string, where the second string is a feature identifier obtained by means of hash processing.

In another embodiment of the present disclosure, a feature identifier and a preset random code are joined to obtain a first joining string, and then hash processing is performed on the first joining string to obtain the second string.

The joining unit 603 is configured to join the application identifier and the second string to obtain a public key of the application identifier.

The verification unit 604 is configured to verify validity of the private key of the application identifier according to the public key of the application identifier.

The public key of the application identifier and the private key of the application identifier are a key pair. The verification unit 604 decrypts, using the public key of the application identifier, content encrypted using the private key of the application identifier. If the content encrypted using the private key of the application identifier is successfully decrypted, it proves that the private key of the application identifier is valid.

It may be learned from the foregoing that, according to the terminal 60 provided in this embodiment of the present disclosure, the terminal 60 verifies validity of a private key of an application identifier according to a public key of the application identifier, where the public key of the application identifier is generated according to a feature identifier and the application identifier. If the private key of the application identifier is valid, when the terminal 60 communicates with an interaction object, the interaction object can prove, by verifying the private key of the application identifier, that the application identifier is authenticated by a trustworthy organization, and the application identifier is reliable. This also reduces a possibility of disclosing private information.

Optionally, based on the foregoing terminal embodiment, in another terminal embodiment of the present disclosure, the terminal 60 further includes a determining unit (not shown) and a sending unit (not shown).

The determining unit is configured to determine, by the terminal 60 according to an application requirement of the user, a target object with which the terminal 60 needs to interact if the private key of the application identifier is valid.

The terminal 60 may receive information entered by the user, and determine a requirement of the user according to the information entered by the user.

The sending unit is configured to send an interaction request to the target object, where the interaction request includes a digital signature, the application identifier, and the second string such that the target object verifies an identity of the terminal 60 according to the second string, the application identifier, and the digital signature, where the digital signature is obtained by encrypting the second string by the terminal 60 according to the private key of the application identifier.

The digital signature includes one or more of a type of the application identifier, an identifier of the target object, a timestamp, or a randomizer. The timestamp proves a validity period of the communication information. The randomizer enhances security of the encryption information. The type of the application identifier indicates an application scope of the private key of the application identifier.

In another embodiment of the present disclosure, the interaction request further includes the application identifier of the terminal such that the target object identifies the terminal 60 using the application identifier.

Figure 8:
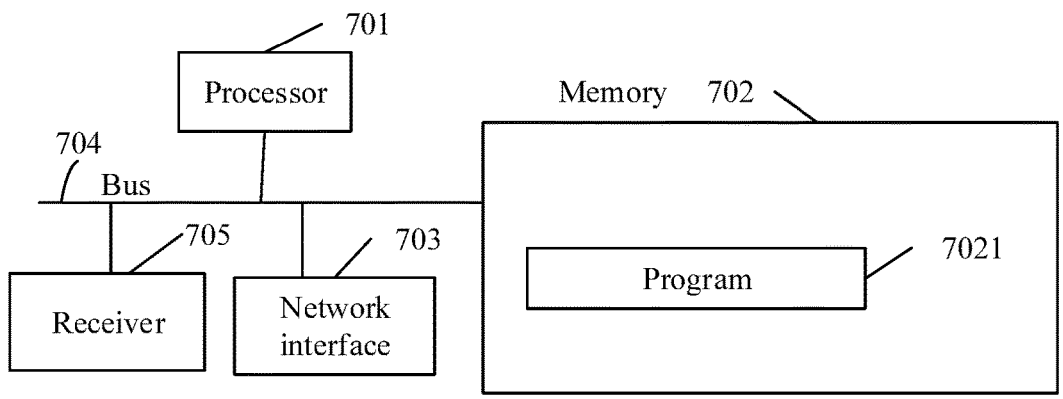
FIG. 8 is a structural diagram of an identifier management apparatus according to another embodiment of the present disclosure.

FIG. 8 describes a structure of an identifier management apparatus according to another embodiment of the present disclosure, where the identifier management apparatus includes at least one processor 701, such as a central processing unit (CPU), a memory 702, at least one network interface 703, at least one communications bus 704, and at least one receiver 705, which are configured to implement connection and communication between these apparatuses. The processor 701 is configured to execute an executable module stored in the memory 702, for example, a computer program. The memory 702 may include a high-speed random access memory (RAM), and may further include a non-volatile memory, for example, at least one Embedded Multi Media Card (eMMC) memory. The at least one network interface 703, which may be wired or wireless implements communicative connection between a network device and at least one other network element over the Internet, a wide area network, a local area network, a metropolitan area network, or the like.

In some implementation manners, a program 7021 is stored in the memory 702, where the program 7021 may be executed by the processor 701, and this program 7021 includes receiving a request sent by a terminal to apply for a private key of an application identifier, acquiring a user identifier and an application identifier according to the request, acquiring a feature identifier of the user according to the user identifier, generating a private key of the application identifier according to the application identifier and the feature identifier of the user, and sending the private key of the application identifier to the terminal.

Optionally, based on the foregoing program 7021, generating a private key of the application identifier according to the application identifier and the feature identifier of the user includes performing hashing on the feature identifier of the user to obtain a first string, joining the application identifier and the first string to obtain a second string, and obtaining the private key of the application identifier according to a preset private key generation algorithm and the second string.

Optionally, based on the foregoing program 7021, the request includes a type of the application identifier, and generating a private key of the application identifier according to the application identifier and the feature identifier of the user includes generating the private key of the application identifier according to the application identifier, the type of the application identifier, and the feature identifier of the user.

Optionally, based on the foregoing program, generating the private key of the application identifier according to the application identifier, the type of the application identifier, and the feature identifier of the user includes obtaining a third string according to the type of the application identifier and the feature identifier of the user, performing hashing on the third string according to a preset hash function to obtain a fourth string, joining the application identifier and the fourth string to obtain a fifth string, and obtaining the private key of the application identifier according to a preset private key generation algorithm and the fifth string.

Optionally, based on the foregoing program 7021, the request includes a digital signature of the user, and before generating a private key of the application identifier according to the application identifier and the feature identifier of the user, the program 7021 further includes acquiring a public key of the user according to the user identifier, verifying the digital signature of the user according to the public key of the user, and generating the private key of the application identifier according to the application identifier and the feature identifier of the user when the digital signature of the user is successfully verified.

Optionally, based on the foregoing program 7021, before sending the private key of the application identifier to the terminal, the program 7021 further includes encrypting the private key of the application identifier according to the public key of the user, and sending the private key of the application identifier to the terminal includes sending the encrypted private key of the application identifier to the terminal.

Optionally, based on the foregoing program 7021, before acquiring a feature identifier of the user according to the user identifier, the program 7021 further includes receiving the user identifier and a biometric feature sent by the terminal, generating the feature identifier of the user according to a first preset algorithm and the biometric feature, and saving a correspondence between the user identifier and the feature identifier of the user, and the acquiring a feature identifier of the user according to the user identifier includes acquiring, according to the correspondence, the feature identifier of the user corresponding to the user identifier.

Optionally, based on the foregoing program, acquiring a feature identifier of the user according to the user identifier includes acquiring a biometric feature of the user from the user identifier, and generating the feature identifier of the user according to a second preset algorithm and the biometric feature of the user.

Specific implementation steps are the same as the embodiment shown in FIG. 1, and details are not described herein again.

It may be learned from the foregoing that, according to the identifier management apparatus provided in this embodiment of the present disclosure, the identifier management apparatus generates a private key of an application identifier according to the application identifier and a feature identifier of a user. There exists a correspondence between the private key of the application identifier and the application identifier. Therefore, when the user encrypts communication content using the private key of the application identifier, a communication peer determines, by verifying validity of the private key of the application identifier, whether the application identifier is acquired by a valid user from a trustworthy organization. In this way, security of the communication content is ensured while a risk of disclosing user privacy is reduced.

Figure 9:
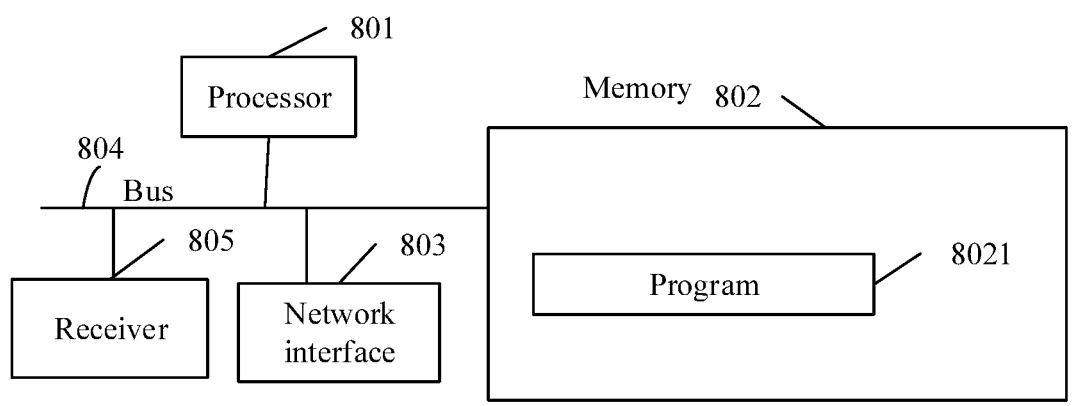
FIG. 9 is a structural diagram of a terminal according to another embodiment of the present disclosure.

FIG. 9 describes a structure of a terminal according to another embodiment of the present disclosure, including at least one processor 801 (for example, a CPU), a memory 802, at least one network interface 803, at least one communications bus 804, and at least one receiver 805, which are configured to implement connection and communication between these apparatuses. The processor 801 is configured to execute an executable module stored in the memory 802, for example, a computer program. The memory 802 may include a high-speed RAM, and may further include a non-volatile memory, for example, at least one eMMC memory. The at least one network interface 803 (which may be wired or wireless) implements communicative connection between the network device and at least one other network element over the Internet, a wide area network, a local area network, a metropolitan area network, or the like.

In some implementation manners, a program 8021 is stored in the memory 802, where the program 8021 may be executed by the processor 801, and this program 8021 includes receiving a first string sent by an identifier management apparatus, where the first string is in an encrypted state, decrypting the first string according to a private key of a user to acquire a second string and a private key of the application identifier from the first string, where the second string is a feature identifier obtained by means of hash processing, joining the application identifier and the second string to obtain a public key of the application identifier, and verifying validity of the private key of the application identifier according to the public key of the application identifier.

Optionally, based on the foregoing program 8021, after the verifying validity of the private key of the application identifier according to the public key of the application identifier, the program 8021 further includes determining, according to an application requirement of the user, a target object with which the terminal needs to interact if the private key of the application identifier is valid, and sending an interaction request to the target object, where the interaction request includes a digital signature, the application identifier, and the second string such that the target object verifies an identity of the terminal according to the second string, the application identifier, and the digital signature, where the digital signature is obtained by encrypting the second string by the terminal according to the private key of the application identifier.

Optionally, based on the foregoing program 8021, the digital signature further includes one or more of a type of the application identifier, an identifier of the target object, a timestamp, or a randomizer.

It may be learned from the foregoing that, according to the terminal provided in this embodiment of the present disclosure, the terminal verifies validity of a private key of an application identifier according to a public key of the application identifier, where the public key of the application identifier is generated according to a feature identifier and the application identifier. If the private key of the application identifier is valid, when the terminal communicates with an interaction object, the interaction object can prove, by verifying the private key of the application identifier, that the application identifier is authenticated by a trustworthy organization, and the application identifier is reliable. This also reduces a possibility of disclosing private information.

It should be noted that, for brief description, the foregoing method embodiments are represented as a series of actions. However, a person skilled in the art should appreciate that the present disclosure is not limited to the described sequence of the actions, because according to the present disclosure, some steps may be performed in other sequences or simultaneously. In addition, a person skilled in the art should also understand that the embodiments described in this specification all belong to preferred embodiments, and the involved actions and modules are not necessarily mandatory to the present disclosure.

Content such as information exchange and an execution process between the modules in the apparatus and the system is based on a same idea as the method embodiments of the present disclosure. Therefore, for detailed content, refer to descriptions in the method embodiments of the present disclosure, and details are not described herein again.

A person of ordinary skill in the art may understand that all or some of the processes of the methods in the embodiments may be implemented by a computer program instructing relevant hardware. The program may be stored in a computer readable storage medium. The processes of the methods in the embodiments are performed when the program runs. The foregoing storage medium may include a magnetic disk, an optical disc, a read-only memory (ROM), or a RAM.

Specific examples are used in this specification to describe the principle and implementation manners of the present disclosure. The descriptions of the foregoing embodiments are merely intended to help understand the method and idea of the present disclosure. In addition, with respect to the implementation manners and the application scope, modifications may be made by a person of ordinary skill in the art according to the idea of the present disclosure. Therefore, this specification shall not be construed as a limitation on the present disclosure.

What is claimed is:

1. A method for managing an application identifier, comprising:
receiving, by an identifier management apparatus, a request from a terminal to apply for a private key of the application identifier, wherein the request comprises a type of the application identifier;
acquiring, by the identifier management apparatus, a user identifier and the application identifier according to the request;
acquiring, by the identifier management apparatus, a feature identifier of a user according to the user identifier;
generating, by the identifier management apparatus, the private key of the application identifier according to the application identifier, the type of the application identifier, and the feature identifier of the user; and
sending, by the identifier management apparatus, the private key of the application identifier to the terminal.

2. The method of claim 1, wherein generating the private key of the application identifier comprises:
performing, by the identifier management apparatus, hashing on the feature identifier of the user to obtain a first string;
joining, by the identifier management apparatus, the application identifier and the first string to obtain a second string; and
obtaining, by the identifier management apparatus, the private key of the application identifier according to a preset private key generation algorithm and the second string.

3. The method of claim 1, wherein generating the private key of the application identifier comprises:
obtaining, by the identifier management apparatus, a third string according to the type of the application identifier and the feature identifier of the user;
performing, by the identifier management apparatus, hashing on the third string according to a preset hash function to obtain a fourth string;
joining, by the identifier management apparatus, the application identifier and the fourth string to obtain a fifth string; and obtaining, by the identifier management apparatus, the private key of the application identifier according to a preset private key generation algorithm and the fifth string.

4. The method of claim 1, wherein the request comprises a digital signature of the user, and wherein before generating the private key of the application identifier, the method further comprises:
acquiring, by the identifier management apparatus, a public key of the user according to the user identifier;
verifying, by the identifier management apparatus, the digital signature of the user according to the public key of the user; and
generating, by the identifier management apparatus, the private key of the application identifier according to the application identifier and the feature identifier of the user when the digital signature of the user is successfully verified.

5. The method of claim 4, wherein before sending the private key of the application identifier to the terminal, the method further comprises encrypting, by the identifier management apparatus, the private key of the application identifier according to the public key of the user, and wherein sending the private key of the application identifier to the terminal comprises sending, by the identifier management apparatus, the encrypted private key of the application identifier to the terminal.

6. The method of claim 1, wherein before acquiring the feature identifier of the user according to the user identifier, the method further comprises:
receiving, by the identifier management apparatus, the user identifier and a biometric feature from the terminal;
generating, by the identifier management apparatus, the feature identifier of the user according to a first preset algorithm and the biometric feature; and
saving, by the identifier management apparatus, a correspondence between the user identifier and the feature identifier of the user, and
wherein acquiring the feature identifier of the user comprises acquiring, by the identifier management apparatus according to the correspondence, the feature identifier of the user corresponding to the user identifier.

7. The method of claim 1, wherein acquiring the feature identifier of the user comprises:
acquiring, by the identifier management apparatus, a biometric feature of the user from the user identifier; and
generating, by the identifier management apparatus, the feature identifier of the user according to a second preset algorithm and the biometric feature of the user.

8. An apparatus for managing an application identifier, comprising:
a memory comprising instructions;
a receiver configured to receive a request from a terminal to apply for a private key of the application identifier, wherein the request comprises a type of the application identifier;
a processor coupled to the memory and the receiver, wherein the instructions cause the processor to be configured to:
acquire a user identifier and the application identifier according to the request;
acquire a feature identifier of the user according to the user identifier; and
generate a private key of the application identifier according to the application identifier, the type of the application identifier, and the feature identifier of the user; and
a transmitter coupled to the processor and configured to send the private key of the application identifier to the terminal.

9. The apparatus of claim 8, wherein the instructions further cause the processor to be configured to:
perform hashing on the feature identifier of the user to obtain a first string;
join the application identifier and the first string to obtain a second string; and
obtain the private key of the application identifier according to a preset private key generation algorithm and the second string.

10. The apparatus according of claim 8, wherein the instructions further cause the processor to be configured to:
obtain a third string according to the type of the application identifier and the feature identifier of the user;
perform hashing on the third string according to a preset hash function to obtain a fourth string;
join the application identifier and the fourth string to obtain a fifth string; and
obtain the private key of the application identifier according to a preset private key generation algorithm and the fifth string.

11. The apparatus of claim 8, wherein the request comprises a digital signature of the user, and wherein the instructions further cause the processor to be configured to:
acquire a public key of the user according to the user identifier;
verify the digital signature of the user according to the public key of the user; and
generate the private key of the application identifier according to the application identifier and the feature identifier of the user when the digital signature of the user is successfully verified.

12. The apparatus of claim 11, wherein the instructions further cause the processor to be configured to encrypt the private key of the application identifier according to the public key of the user, and wherein the instructions further cause the transmitter to be configured to send the encrypted private key of the application identifier to the terminal.

13. The apparatus of claim 8, wherein the instructions further cause the receiver to be configured to receive the user identifier and a biometric feature sent by the terminal, and wherein the instructions further cause the processor to be configured to:
generate the feature identifier of the user according to a first preset algorithm and the biometric feature;
save a correspondence between the user identifier and the feature identifier of the user; and
acquire, according to the correspondence, the feature identifier of the user corresponding to the user identifier.

14. The apparatus of claim 8, wherein the instructions further cause the processor to be configured to:
acquire a biometric feature of the user from the user identifier; and
generate the feature identifier of the user according to a second preset algorithm and the biometric feature of the user.

* * * * *